United States Patent
Lei et al.

(10) Patent No.: US 10,151,907 B2
(45) Date of Patent: Dec. 11, 2018

(54) FULL-COLOR THREE-DIMENNSIONAL OPTICAL SECTIONING MICROSCOPIC IMAGING SYSTEM AND METHOD BASED ON STRUCTURED ILLUMINATION

(71) Applicant: Xi'an Institute of Optics and Precision Mechanics of CAS, Xi'an, Shaanxi (CN)

(72) Inventors: Ming Lei, Shaanxi (CN); Baoli Yao, Shaanxi (CN); Jia Qian, Shaanxi (CN); Dan Dan, Shaanxi (CN); Xing Zhou, Shaanxi (CN); Yanlong Yang, Shaanxi (CN); Shaohui Yan, Shaanxi (CN); Junwei Min, Shaanxi (CN)

(73) Assignee: XI'AN INSTITUTE OF OPTICS AND PRECISION MECHANICS OF CAS, Xi'an, Shaanxi (CN)

( * ) Notice: Subject to any disclaimer, the term of this patent is extended or adjusted under 35 U.S.C. 154(b) by 245 days.

(21) Appl. No.: 15/306,950

(22) PCT Filed: Nov. 24, 2015

(86) PCT No.: PCT/CN2015/095354
§ 371 (c)(1),
(2) Date: Oct. 26, 2016

(87) PCT Pub. No.: WO2016/107334
PCT Pub. Date: Jul. 7, 2016

(65) Prior Publication Data
US 2017/0052356 A1 Feb. 23, 2017

(30) Foreign Application Priority Data
Dec. 30, 2014 (CN) .......................... 2014 1 0849425

(51) Int. Cl.
*G02B 21/00* (2006.01)
*H04N 13/257* (2018.01)
(Continued)

(52) U.S. Cl.
CPC ..... *G02B 21/0064* (2013.01); *G02B 21/0032* (2013.01); *G02B 21/36* (2013.01);
(Continued)

(58) Field of Classification Search
CPC ............ G02B 21/0064; G02B 21/0032; G02B 21/367; G02B 21/36; G02B 26/0833;
(Continued)

(56) References Cited

U.S. PATENT DOCUMENTS 6,473,230 B2 * 10/2002 Hedrich ................. G02B 21/18
359/368
2003/0076587 A1 * 4/2003 Stelzer ............... G02B 21/0032
359/388
(Continued)

FOREIGN PATENT DOCUMENTS

CN 1800902 A 7/2006
CN 2828847 Y 10/2006
(Continued)

*Primary Examiner* — Joseph Suh
(74) *Attorney, Agent, or Firm* — Novick, Kim & Lee, PLLC; Allen Xue

(57) ABSTRACT

The present invention provides a full-color three-dimensional optical sectioning microscopic imaging system and method based on structured illumination, includes an illumination source, a dichroic prism positioned at the illumination optical path, a structured light generator positioned at the reflected optical path of the dichroic prism, a lens positioned at the transmitted optical path of the dichroic prism, a beam splitter positioned at the optical path of the lens, an objective lens and a sample stage positioned at the upper optical path of the beam splitter, a reflector mirror and (Continued)

a tube lens positioned at the lower optical path of the beam splitter and a CCD camera positioned behind the tube lens. The illumination source is an incoherent monochrome LED or a white light LED The structured light generator is a DMD (Digital Micro-mirror Device).

6 Claims, 4 Drawing Sheets

(51) Int. Cl.
  *G02B 21/36* (2006.01)
  *H04N 5/225* (2006.01)
  *H04N 5/372* (2011.01)
  *H04N 9/077* (2006.01)
  *G02B 26/08* (2006.01)
  *G02B 27/14* (2006.01)

(52) U.S. Cl.
  CPC ......... *G02B 21/367* (2013.01); *H04N 5/2256* (2013.01); *H04N 5/372* (2013.01); *H04N 9/077* (2013.01); *H04N 13/257* (2018.05); *G02B 21/0084* (2013.01); *G02B 26/0833* (2013.01); *G02B 27/141* (2013.01)

(58) Field of Classification Search
  CPC .............. G02B 21/0084; G02B 27/141; H04N 13/257; H04N 9/077; H04N 5/2256; H04N 5/372
  See application file for complete search history.

(56) References Cited

U.S. PATENT DOCUMENTS

| | | | |
|---|---|---|---|
| 2006/0017001 A1* | 1/2006 | Donders | G02B 21/0036 250/390.07 |
| 2009/0091751 A1* | 4/2009 | Golovanevsky | G01N 21/9501 356/237.4 |
| 2009/0225407 A1* | 9/2009 | Nakayama | G02B 21/082 359/370 |
| 2010/0108873 A1* | 5/2010 | Schwertner | G01B 11/2504 250/252.1 |
| 2011/0033887 A1* | 2/2011 | Fang | B01L 3/502707 435/41 |
| 2011/0182529 A1* | 7/2011 | Kempe | G01N 21/6458 382/274 |
| 2016/0266362 A1* | 9/2016 | Kapanidis | G02B 21/0008 |

FOREIGN PATENT DOCUMENTS

| | | |
|---|---|---|
| CN | 102540446 A | 7/2012 |
| CN | 103105671 A | 5/2013 |

* cited by examiner

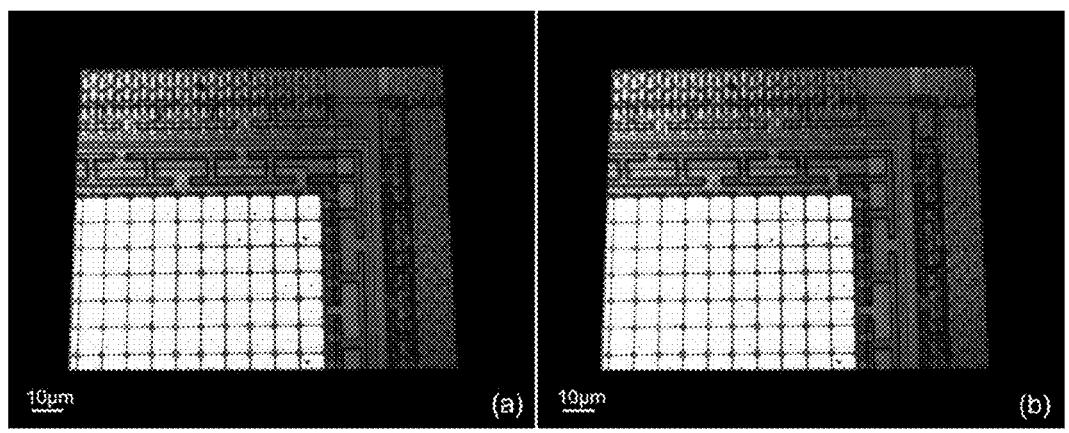
FIG. 5(a)          FIG. 5(b)

FULL-COLOR THREE-DIMENNSIONAL OPTICAL SECTIONING MICROSCOPIC IMAGING SYSTEM AND METHOD BASED ON STRUCTURED ILLUMINATION

TECHNICAL FIELD

The present invention relates to a structured illumination microscopic system and method, which can achieve fast full-color three-dimensional optical sectioning imaging, and can be widely used in biology, medicine, materials science and microelectronics.

BACKGROUND OF THE INVENTION

Represented by laser scanning confocal microscopy and two-photon microscopy, point scanning microscopic imaging technologies have the ability of three-dimensional sectioning imaging, thus have offered a wide range of applications in the researches of biomedical and materials science. Point scanning technologies get two-dimensional images at the focal plane of the objective lens by scanning the highly converged laser focus, and through axially scanning layer by layer to obtain the three-dimensional sectioned images of the sample. With the emergence of various new fluorescent molecular probes, the multicolor scanning microscopies allow the visualization of multiple protein interactions in living cells simultaneously. Besides, multicolor fluorescent labeling also provides improved imaging contrast and definition. High-end multicolor scanning microscopes developed so far are based on the multi-channel integration geometry. Multiple laser excitation sources and photomultiplier tube detectors for different color channels are employed, and the signals from each channel (red, green, and blue) are detected sequentially and combined into a single file. Laser scanning microscopies have axially sectioning capability and high spatial resolution, but scanning the entire three-dimensional samples point by point require a long time and the high power of laser may produce strong light damage and phototoxicity to living cells and tissues.

Differing from laser scanning imaging technologies, wide-field imaging can get all the two-dimensional information of the imaging plane by a single exposure using CCD or CMOS cameras. However, due to the certain depth of field of the objective lens, the image obtained by the CCD camera is actually the superimposing of the focal plane and the out-of-focus background. Due to the influence of the out-of-focus background, the image signal to noise ratio and the spatial resolution have been greatly restricted. Therefore, ordinary wide-field imaging cannot achieve three-dimensional sectioned images. Emerging in recent years, structured illumination microscopy (SIM) is a kind of wide-field optical microscopy, while has three-dimensional imaging capability. By projecting high spatial fringe pattern onto the sample, SIM can effectively separate the out-of-focus information and the in-focus information of the wide-field image by imaging processing algorithms. Scanning the sample along the axial direction of the objective lens by using the motorized sample stage, three-dimensional sectioned image can be obtained. Compared with laser scanning technologies, SIM has faster imaging speed and more compact configuration, light damage and phototoxity effect are also much slighter. Thus it's more suitable for in-vivo real-time imaging and research of biological tissues.

So far, most SIM systems use monochrome CCD or CMOS cameras to acquire images and cannot acquire the natural color information of the specimens. However, for a number of research areas (such as surface morphology measurements, materials science and other fields), it is very important to recover the color information of the sample. Although color sectioned images can be obtained via the use of confocal microscope under the principle of multicolor fluorescent labeling and multi-channel integration, the imaging speed is limited and the color is just the result of multicolor synthetic, not the real color.

SUMMARY OF THE INVENTION

View the current case that SIM cannot obtain a sample's color information with high speed, a color three-dimensional sectioning microscopic imaging system and method based on structured illumination are proposed.

Technical solutions of the present invention are:

A full-color three-dimensional optical sectioning microscopic imaging system based on structured illumination includes an illumination source 1, a dichroic prism 2 positioned at the illumination optical path, a structured light generator 3 positioned at the reflected optical path of 2, a lens 4 positioned at the transmitted optical path of 2, a beam splitter 5 positioned at the optical path of 4, an objective lens 6 and a sample stage 7 positioned at the upper optical path of 5, a reflector mirror 8 and a tube lens 9 positioned at the lower optical path of 5 and a CCD camera 10 positioned behind 9.

Wherein:

The CCD camera 10 is a color CCD camera.

The illumination source 1 is an incoherent monochrome LED or a white light LED

The structured light generator 3 is a DMD (Digital Micro-mirror Device).

The above-described beam splitter 5 is a long-pass dichroic.

The above-described beam splitter 5 is a broad band beam-splitter.

A full-color three-dimensional optical sectioning microscopic imaging method based on structured illumination, wherein, includes the following steps:

Step. 1) Generating structured illumination light pattern:

Use a monochrome LED or a white light LED as the illumination source, and combine with a DMD to generate three structured illumination patterns with same orientation but different phases. The structured illumination patterns illuminate the sample placed on the sample stage through the objective lens.

Step. 2) Collecting images by a color CCD camera:

Corresponding to three structured illumination patterns with different phases (0°, 120°, and 240°), the color CCD camera collect three two-dimensional color images $I_0(RGB)$, $I_{120}(RGB)$ and $I_{240}(RGB)$, respectively.

Step. 3) Image processing:

Step. 3.1) Convert the three 2D color images $I_0(RGB)$, $I_{120}(RGB)$ and $I_{240}(RGB)$ from RGB color space to HSV color space according to the following conversion equation (1), and then get three 2D images with different phases in HSV color space: $I_0(HSV)$, $I_{120}(HSV)$ and $I_{240}(HSV)$, $$H = \begin{cases} 0°, & \text{if max} = \text{min} \\ 60° \times \frac{G-R}{\text{max}-\text{min}} + 0°, & \text{if max} = R, \text{and } G \geq B \\ 60° \times \frac{G-R}{\text{max}-\text{min}} + 360°, & \text{if max} = R, \text{and } G < B \\ 60° \times \frac{B-R}{\text{max}-\text{min}} + 120°, & \text{if max} = G \\ 60° \times \frac{B-R}{\text{max}-\text{min}} + 240°, & \text{if max} = B \end{cases} \quad (1)$$

$$S = \begin{cases} 0, & \text{if max} = 0 \\ 1 - \frac{\text{min}}{\text{max}}, & \text{if max} = B \end{cases}$$

$$V = \text{max}$$

where max=max{R, G, B}, min=min{R, G, B}.

Step. 3.2) According to equation (2), three wide-field images $I_{wide}(i)$ in H channel, S channel and V channel are calculated respectively, where i=H, S, V; According to equation (3), three sectioned images $I_z(i)$ in H channel, S channel and V channel are calculated respectively, where i=H, S, V.

$$I_{wide}(i) = \frac{1}{3}[I_0(i) + I_{120}(i) + I_{240}(i)] \quad (2)$$

$$I_z(i) = \sqrt{[I_0(i) - I_{120}(i)]^2 + [I_{120}(i) - I_{240}(i)]^2 + [I_{240}(i) - I_0(i)]^2} \quad (3)$$

Step. 3.3) Combine the three sectioned images got in Step. 3.2) to a single sectioned image and reconvert it from HSV color space to RGB color space; Combine the three wide-filed images got in Step. 3.2) to a single wide-field image without fringe patterns and reconvert it from HSV color space to RGB color space; Converting from HSV color space to RGB color space according to conversion equation (4), where $H_i = \lfloor H/60° \rfloor$.

$$R = \begin{cases} V, & \text{if } H_{mod} = 0 \text{ or } H_{mod} = 5 \\ V[1 - S(\frac{H}{60°} - H_{mod})], & \text{if } H_{mod} = 1 \\ V(1 - S), & \text{if } H_{mod} = 2 \text{ or } H_{mod} = 3 \\ V[1 - S(1 - \frac{H}{60°} + H_{mod})], & \text{if } H_{mod} = 4 \end{cases} \quad 4)$$

$$G = \begin{cases} V[1 - S(1 - \frac{H}{60°} + H_{mod})], & \text{if } H_{mod} = 0 \\ V, & \text{if } H_{mod} = 1 \text{ or } H_{mod} = 2 \\ V[1 - S(\frac{H}{60°} - H_{mod})], & \text{if } H_{mod} = 3 \\ V(1 - S), & \text{if } H_{mod} = 4 \text{ or } H_{mod} = 5 \end{cases}$$

$$B = \begin{cases} V(1 - S), & \text{if } H_{mod} = 0 \text{ or } H_{mod} = 1 \\ V[1 - S(1 - \frac{H}{60°} + H_{mod})], & \text{if } H_{mod} = 2 \\ V, & \text{if } H_{mod} = 3 \text{ or } H_{mod} = 4 \\ V[1 - S(\frac{H}{60°} - H_{mod})], & \text{if } H_{mod} = 5 \end{cases}$$

Step. 3.4) Normalize the sectioned image $I_z$(RGB) got in Step. 3.3) to get the normalized sectioned image $I_{z\_Norm}$(RGB), and then multiply it with the wide-field image $I_{wide}$(RGB) to get the two-dimensional color sectioned image $I_{z\_result}$(RGB) of this layer.

Step. 4) Depending on the thickness of the sample, repeat Step. 2) and Step. 3) in required times, to obtain a series of two-dimensional color sectioned images along Z-direction. Finally, the completely three-dimensional color image of the sample $I_{result}$(RGB) can be obtained.

The above-mentioned monochrome LED source is an incoherent LED source.

The above-mentioned monochromatic LED source is a 450 nm wavelength blue LED.

The advantages of the present invention are:

1. The present invention do imaging processing and restoration of color information of the sample in HSV color space. Compared to conventional RGB color space, HSV color space avoid the crosstalk of the three channels of R, G and B, and can accurately obtain the natural color information of the sample.

HSV (Hue, Saturation, and Value) color space is much closer to people's experience and perception of color than RGB space. It was created in 1978 by A. R. Smith. The angle around the central vertical axis corresponds to "hue", which describes what a pure color is. Starting at the red primary at 0°, "H" passes through the green primary at 120° and the blue primary at 240°, then wraps back to red at 360°. Their complementary colors are: yellow at 60°, cyan at 180° and magenta at 300°. The distance from the vertical axis corresponds to "saturation", which represents the purity of colors. It takes values from 0 to 1. The height corresponds to the color brightness in relation to the saturation, for which V=0 means black while V=1 means white.

2. So far, the structured illumination optically sectioning decoding algorithms will cause a reduction in the gray scales of images and then affect the effect of color restoration. In the present invention, we make a normalization of the sectioned image and then multiply it with the wide-field image. By doing so, the gray scales of the restored color image will be much fuller, and the color will be much more natural.

3. The present invention can restore true color information from the images getting from the color CCD cameras. In contrast to the use of a monochrome CCD and multi-channel integration, the result is much more accurate and the system is more compact.

4. The present invention can either use a LED with specific wavelength as excitation source to get the color of the labeled fluorescence the samples, or use a white light LED to illuminate reflective samples to get their full-color information.

BRIEF DESCRIPTION OF THE DRAWINGS

FIG. 3 is the 3D reconstructed images of mixed pollen grain specimen. The color comes from the auto-fluorescence of the pollen grain under the excitation of blue LED In which FIG. 3(a) is the 3D color reconstructed image and FIG. 3(b) is the 3D monochrome reconstructed image using an conventional SIM system (for comparison);

FIGS. 4(a) and 4(b) are the 3D reconstructed images of pollen grains with different colors and shapes. In which FIG. 4(a) is the 3D color reconstructed image and FIG. 4(b) is the 3D monochrome reconstructed image using an conventional SIM system (for comparison);

FIGS. 5(a) and 5(b) are the 3D reconstructed images of a micro circuit chip. In which FIG. 5(a) is the 3D color reconstructed image, the color comes from the reflection of the metallic surface illuminated by a white light LED and FIG. 5(b) is the 3D monochrome reconstructed image using an conventional SIM system (for comparison).

EMBODIMENTS OF THE INVENTION

Figure 1:
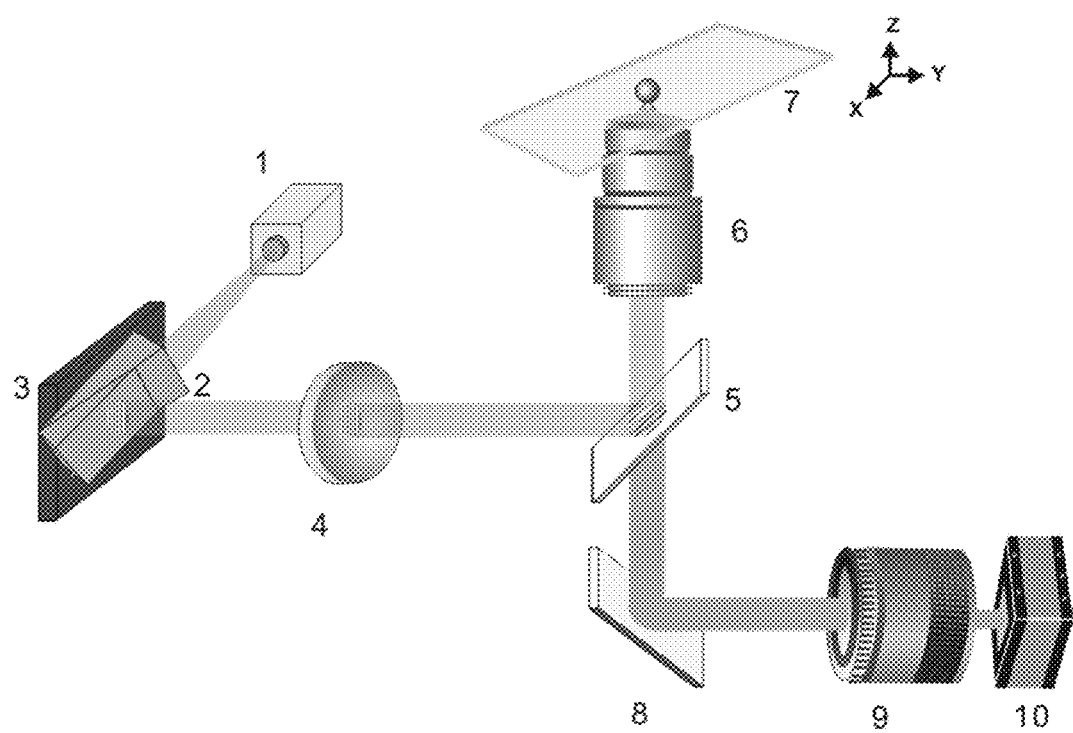
FIG. 1 is the schematic diagram of the full-color three-dimensional optical sectioning microscopic imaging system based on structured illumination.

The present invention is a full-color 3D optical sectioning microscopic imaging system based on structured illumination. As shown in FIG. 1, it includes an illumination source 1, a dichroic prism 2 positioned at the illumination optical path, a structured light generator 3 positioned at the reflected optical path of 2, a lens 4 positioned at the transmitted optical path of 2, a beam splitter 5 positioned at the optical path of 4, an objective lens 6 and a sample stage 7 positioned at the upper optical path of 5, a reflector mirror 8 and a tube lens 9 positioned at the lower optical path of 5 and a CCD camera 10 positioned behind 9. The CCD camera 10 is a color CCD camera. The illumination source 1 is an incoherent monochrome LED or a white light LED. The structured light generator 3 is a DMD (Digital Micro-mirror Device).

The present invention can be applied to either fluorescently labeled specimens or non-fluorescent reflective specimens.

1. Reconstruction of Three-Dimensional Color Image of Mixed Pollen Grains

Step. 1) A 450 nm wavelength LED enters the dichroic prism and irradiates the DMD chip perpendicularly, the reflective light transmits the dichroic prism and enters the collimate lens, then illuminates the pollen grain sample through the objective lens.

Step. 2) Lie the mixed pollen grain sample in the structured light field and place it on the sample stage.

Figure 2:
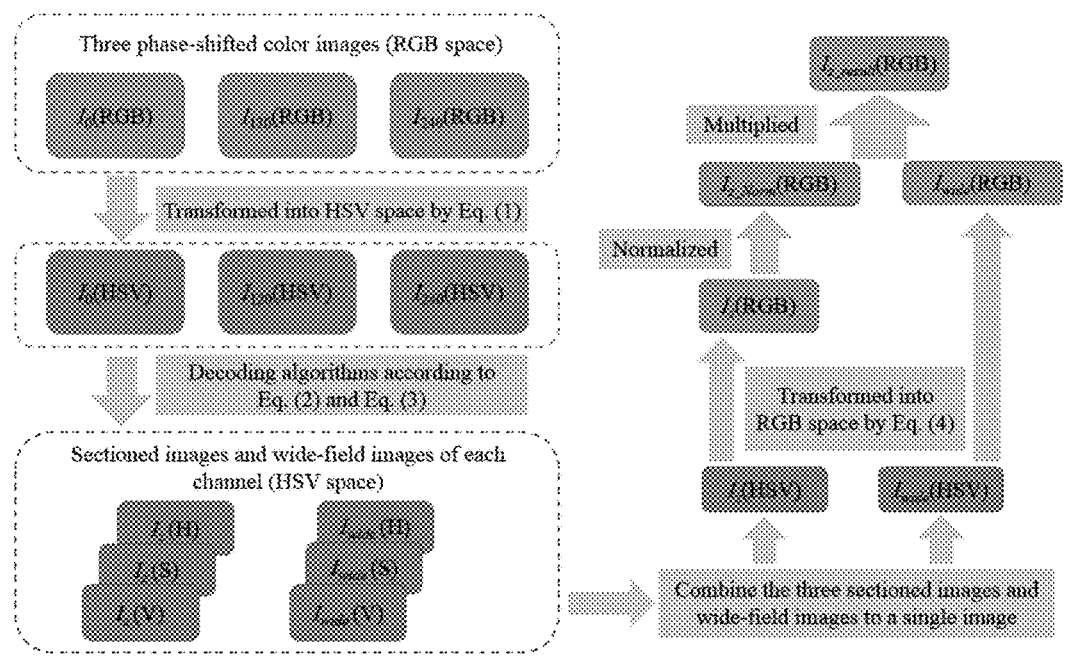
FIG. 2 is the flowchart diagram of technical solution 3.

Step. 3) Control the DMD load three structured fringe patterns with different phases (0°, 120°, and 240°), color CCD camera respectively collect three two-dimensional color images $I_0(RGB)$, $I_{120}(RGB)$ and $I_{240}(RGB)$, which are stored in the computer. Through the imaging processing algorithm mentioned in technical solutions 3, the color sectioned image of this layer will be obtained. FIG. 2 is the specific flow chart diagram of technical solutions 3.

Step. 4) Move the motorized stage along Z direction and repeat Step. 3), two-dimensional sectioned images of other layers of the sample will be obtained, and finally get the complete 3D color image.

Figure 3:
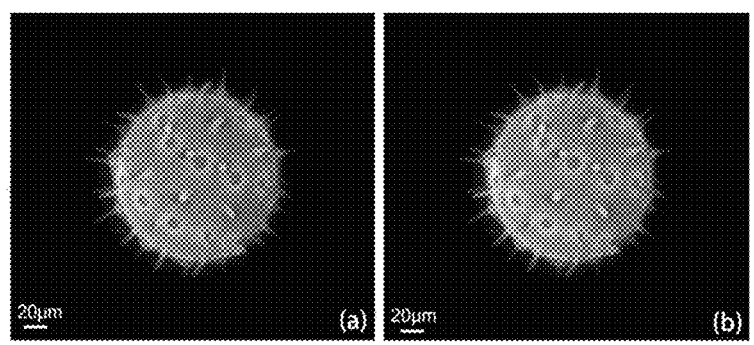

FIG. 3 is the 3D color image of the mixed pollen grains obtained under the use of the system described in the present invention. The color comes from the auto-fluorescence of the pollen grains. A 20×/NA 0.45 objective lens and 450 nm blue LED are used in the experiment. For each image, the exposure time is 0.215 s, and three sub-images are needed for each layer. FIG. 3(a) is the reconstructed 3D color image of the mixed pollen grains using the system of the present invention. As a comparison, FIG. 3(b) is the reconstructed monochrome image using the conventional SIM system.

Figure 4A:
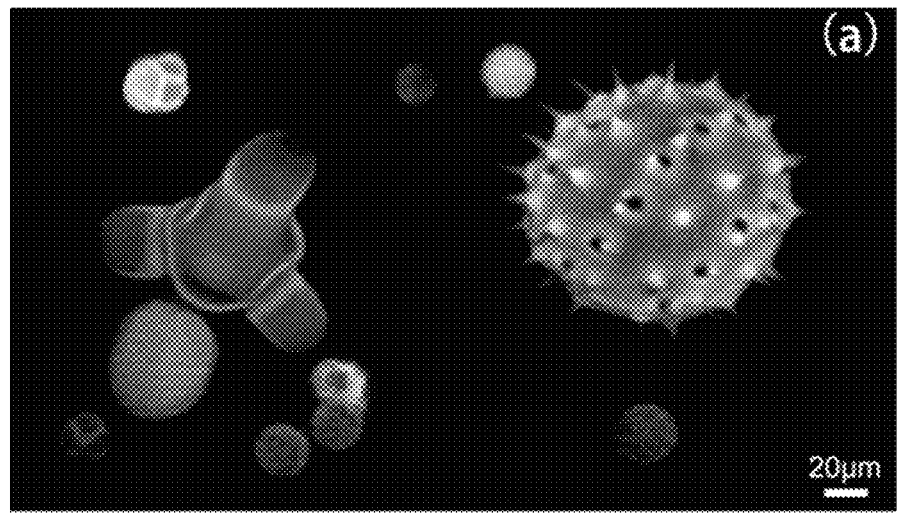
Figure 4B:
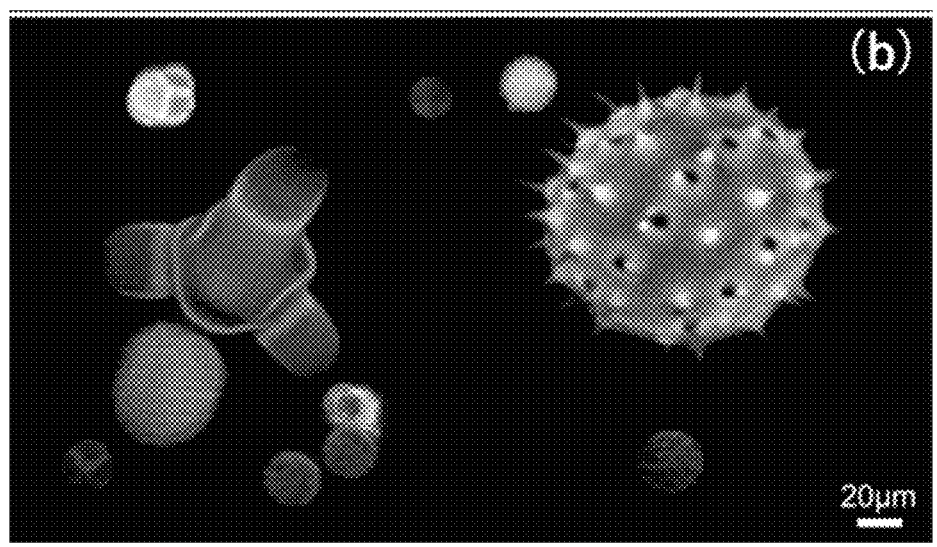

Different pollen grains have different shapes and volumes, it also can be observed that they emit auto-fluorescence with different wavelengths. FIG. 4s show pollen grains with different shapes and colors. FIG. 4(a) is the reconstructed 3D color image using the system of the present invention. As a comparison, FIG. 4(b) is the reconstructed monochrome image using the conventional SIM system.

2. Reconstruction of Three-Dimensional Color Image of a Micro Circuit Chip

Step. 1) Use white light LED as the illumination source, replace the blue LED used for imaging the mixed pollen grains.

Step. 2) In order to collect the reflected light from the metal surface of the micro circuit chip, the long-pass dichroic mirror 5 used for fluorescent imaging is replaced by a 50:50 broad band beam-splitter.

Step. 3) Repeat Step. 2) to Step. 4) in the embodiment of "Reconstruction of three-dimensional color image of mixed pollen grains".

FIG. 5 is the 3D color image of the micro circuit chip obtained after 25 layers imaging. A 20×/NA 0.45 objective lens and a white light LED are used in the experiment. For each image, the exposure time is 0.027 s, and three sub-images are needed for each layer. FIG. 5(a) is the reconstructed 3D color image of the micro circuit chip, the color comes from the reflected light of the chip's surface. As a comparison, FIG. 3(b) is the reconstructed monochrome image using the conventional SIM system.

The invention claimed is:

1. A full-color three-dimensional optical sectioning microscopic imaging system, comprising:
   an illumination source, a dichroic prism positioned in the illumination optical path, a structured light generator positioned in the reflected optical path of the dichroic prism, a lens positioned in the transmitted optical path of the dichroic prism, a beam splitter positioned in the optical path of the lens, an objective lens and a sample stage positioned in the upper optical path of the beam splitter, and a reflector mirror and a tube lens positioned in the lower optical path of the beam splitter.

2. The imaging system of claim 1, further comprising a CCD camera positioned behind the tube lens.

3. The imaging system of claim 2, wherein the CCD camera is a color CCD camera.

4. The imaging system of claim 1, wherein the illumination source is an incoherent monochrome LED or a white light LED.

5. The imaging system of claim 1, wherein the structured light generator is a DMD (Digital Micro-mirror Device).

6. The imaging system of claim 1, wherein the beam splitter is a long-pass dichroic or a broad band beam-splitter.

* * * * *